(12) United States Patent
Huffman

(10) Patent No.: US 11,674,605 B2
(45) Date of Patent: Jun. 13, 2023

(54) METER BAR

(71) Applicant: Mueller International, LLC, Atlanta, GA (US)

(72) Inventor: Jeffrey Allen Huffman, Monticello, IL (US)

(73) Assignee: Mueller International, LLC, Atlanta, GA (US)

( * ) Notice: Subject to any disclaimer, the term of this patent is extended or adjusted under 35 U.S.C. 154(b) by 89 days.

(21) Appl. No.: 16/887,922

(22) Filed: May 29, 2020

(65) Prior Publication Data

US 2021/0372534 A1 Dec. 2, 2021

(51) Int. Cl.
| G01F 15/18 | (2006.01) |
| F16K 11/08 | (2006.01) |
| F16K 11/07 | (2006.01) |

(52) U.S. Cl.
CPC ............ *F16K 11/07* (2013.01); *G01F 15/185* (2013.01)

(58) Field of Classification Search
CPC .. G01F 15/185; F16K 11/085; F16K 11/0856; F16K 31/055; F16K 31/445
See application file for complete search history.

(56) References Cited

U.S. PATENT DOCUMENTS

| | | | |
|---|---|---|---|
| 2,579,656 A * | 12/1951 | Douglas | G01F 15/185 |
| | | | 73/201 |
| 2,632,328 A | 3/1953 | McChesney | |
| 3,238,969 A | 3/1966 | Champion | |
| 3,289,696 A | 12/1966 | Champion | |
| 3,387,632 A | 6/1968 | Grove | |
| 4,602,657 A * | 7/1986 | Anderson, Jr. | G01F 15/185 |
| | | | 137/595 |
| 4,786,409 A | 11/1988 | Miller | |
| 4,821,772 A | 4/1989 | Anderson, Jr. et al. | |
| 7,347,219 B2 | 3/2008 | Gohde et al. | |
| 10,247,594 B2 | 4/2019 | Smith et al. | |
| 11,555,547 B2 | 1/2023 | Peleckas et al. | |
| 11,619,312 B2 | 4/2023 | Peleckas et al. | |
| 2005/0022872 A1 | 2/2005 | Robison | |
| 2007/0089791 A1 | 4/2007 | Gohde et al. | |
| 2013/0263951 A1 | 10/2013 | Gardner | |
| 2018/0313682 A1 | 11/2018 | Smith et al. | |
| 2018/0372235 A1 * | 12/2018 | Smith | F16K 5/0471 |

(Continued)

OTHER PUBLICATIONS

Peleckas, Tomas; Non-Final Office Action for U.S. Appl. No. 17/149,369, filed Jan. 14, 2021, dated Jun. 1, 2022, 27 pgs.

(Continued)

*Primary Examiner* — Paul J Gray
(74) *Attorney, Agent, or Firm* — Taylor English Duma LLP

(57) ABSTRACT

A meter bar includes a housing comprising an inflow end and an outflow end, a key assembly arranged within housing, the key assembly including a key, the key defining an interior and providing a fluid pathway from the inflow end to the outflow end; the key defining a pair of upper portals, one upper portal proximate the inflow end and one upper portal proximate the outflow end; the key defining a pair of lower portals, one lower portal proximate the inflow end and one lower portal proximate the outflow end; the key defining a pair of bypass portals; the key assembly arrangeable within the housing to selectably direct fluid flow from the inflow end to the outflow end either through a meter or bypassing the meter.

7 Claims, 10 Drawing Sheets

(56) References Cited

U.S. PATENT DOCUMENTS

| | | |
|---|---|---|
| 2020/0149945 A1 | 5/2020 | Yaklin |
| 2021/0207986 A1* | 7/2021 | Smith ................... F16K 11/02 |
| 2022/0221068 A1 | 7/2022 | Peleckas et al. |
| 2022/0221070 A1 | 7/2022 | Peleckas et al. |
| 2023/0108033 A1 | 4/2023 | Peleckas et al. |

OTHER PUBLICATIONS

Peleckas, Tomas; Requirement for Restriction/Election for U.S. Appl. No. 17/149,439, filed Jan. 14, 2021, dated Sep. 27, 2022, 6 pgs.

Peleckas, Tomas; Applicant-Initiated Interview Summary for U.S. Appl. No. 17/419,369, filed Jan. 14, 2021, dated Aug. 29, 2022, 2 pgs.

Peleckas, Tomas; Notice of Allowance for U.S. Appl. No. 17/149,369, filed Jan. 14, 2021, dated Sep. 15, 2022, 11 pgs.

Beleckas, Tomas; Notice of Allowance for U.S. Appl. No. 17/149,439, filed Jan. 14, 2021, dated Nov. 28, 2022, 21 pgs.

* cited by examiner

METER BAR

TECHNICAL FIELD

This disclosure relates to municipal utilities. More specifically, this disclosure relates to metering.

BACKGROUND

Metering utilities provides municipalities with information about usage of consumers whom those utilities serve. Metering allows for proper billing and usage forecasting. However, meters sometimes break, needing replacement or service.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A meter bar includes a housing comprising an inflow end and an outflow end, the housing being hollow and defining an interior; a key assembly arranged within the interior, the key assembly comprising an inflow end and an outflow end, the key assembly comprising: a key, the key being hollow and defining an interior, the interior providing a fluid pathway from the inflow end to the outflow end; the key defining a pair of upper portals, one upper portal proximate the inflow end and one upper portal proximate the outflow end; the key defining a pair of lower portals, one lower portal proximate the inflow end and one lower portal proximate the outflow end; the key defining a pair of bypass portals; one junction tube connecting the upper portal on the inflow end to the lower portal on the inflow end; and, one junction tube connecting the upper portal on the outflow end to the lower portal on the outflow end.

A meter bar for connection of a fluid supply line and service line to a meter includes: a housing comprising an inflow end and an outflow end, the housing defining first and second portals proximate the inflow end and first and second portals proximate the outflow end; a key assembly arranged within the housing, the key assembly comprising a key and at least one junction tube, the key assembly comprising an inflow end and an outflow end and defining three fluid pathways, the first fluid pathway arranged to allow fluid communication from the first portal proximate the inflow end to the second portal proximate the inflow end; the second fluid pathway arranged to allow fluid communication from the first portal proximate the outflow end to the second portal proximate the outflow end; and, a third fluid pathway arranged to allow fluid communication from the first portal proximate the inflow end to the first portal proximate the outflow end.

A method of changing the state of a meter bar includes: engaging with a meter bar, the meter bar comprising: a housing comprising an inflow end and an outflow end, the housing defining first and second portals proximate the inflow end and first and second portals proximate the outflow end; a key assembly arranged within the housing, the key assembly selectably arrangeable in one of an open state, a closed state, and a bypass state, the key assembly comprising a key and at least one junction tube, the key defining an access element; the key assembly comprising an inflow end and an outflow end and defining three fluid pathways, the first fluid pathway arranged to allow fluid communication from the first portal proximate the inflow end to the second portal proximate the inflow end; the second fluid pathway arranged to allow fluid communication from the first portal proximate the outflow end to the second portal proximate the outflow end; a third fluid pathway arranged to allow fluid communication from the first portal proximate the inflow end to the first portal proximate the outflow end; engaging the access element with a tool; and moving the tool to rotate the key assembly. Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
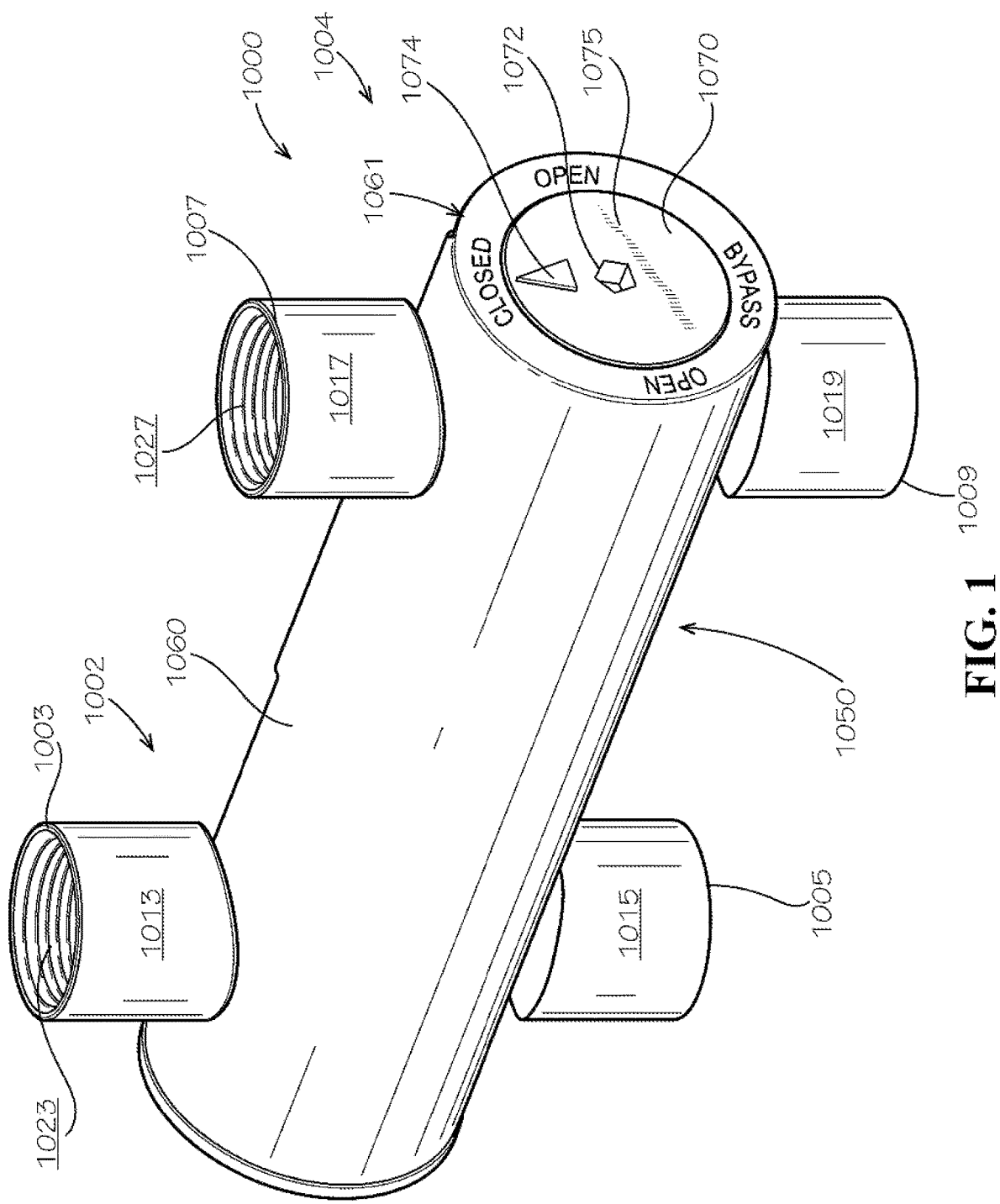
FIG. 1 is a perspective view of a meter bar in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a meter bar or meter bar assembly and associated methods, systems, devices, and various apparatus. It would be understood by one of skill in the art that the disclosed meter bar assembly is described in but a few exemplary embodiments among many. No particular terminology or description should be considered limiting on the disclosure or the scope of any claims issuing therefrom.

One embodiment of a meter bar 1000 is disclosed and described with reference to FIG. 1. The meter bar 1000 of the current disclosure can be utilized to provide meter servicing options for a utility meter such as a gas meter or other fluid meter. The meter bar 1000 can comprise an inflow end 1002 and an outflow end 1004. The inflow end 1002 can comprise an upper coupling 1003 and a lower coupling 1005. The outflow end 1004 can comprise an upper coupling 1007 and a lower coupling 1009. Each coupling 1003, 1005, 1007, 1009 can define a cylindrical shape in various aspects. In various aspects, each coupling 1003, 1005, 1007, 1009 can define a variety of shapes useful for connection of various municipal service lines. Each coupling 1003, 1005, 1007, 1009 can comprise an outer surface 1013, 1015, 1017, 1019, respectively. Each coupling 1003, 1005, 1007, 1009 can comprise an inner surface 1023, 1027 (lower coupling 1005, 1009 inner surfaces not shown). In various aspects, the inner surfaces 1023, 1027 (and the inner surfaces of lower couplings 1005, 1009) can be threaded for attachment of a service line or for attachment to a meter. In various aspects, the inflow end 1002 and outflow end 1004 can be reversed. Each coupling 1003, 1005, 1007, 1009 can be connected to a main body assembly 1050. In particular, each coupling 1003, 1005, 1007, 1009 can be attached to, connected to, or formed with a housing 1060 that can form the main body of the meter bar 1000. In various aspects, the housing 1060 can be cylindrical. In various aspects, the housing 1060 can be a variety of shapes. The main body assembly 1050—and, in particular, the housing 1060—can provide a fluid connection between the inflow end 1002 and the outflow end 1004 as will be described in greater detail below. The housing 1060 can comprise functional indicia intended to provide useful information to an operator. In the current aspect, the housing 1060 can be marked with markings 1061 indicating CLOSED, OPEN, OPEN, or BYPASS states corresponding to an OPEN, a CLOSED, or a BYPASS state of the meter bar 1000. A key 1070 can be assembled into the housing 1060 as will be discussed in additional detail. The key 1070 can define an access element 1072 that, in various aspects, can be operated only by a unique tool designed for meter access. The tool can be utilized to prevent tampering or movement of the key 1070 by an unauthorized agent. The key 1070 can also define an indicia arrow 1074 on an indicia face 1075 of the key 1070 that can indicate the state of the key 1070 and/or the state of the meter bar 1000.

Figure 2:
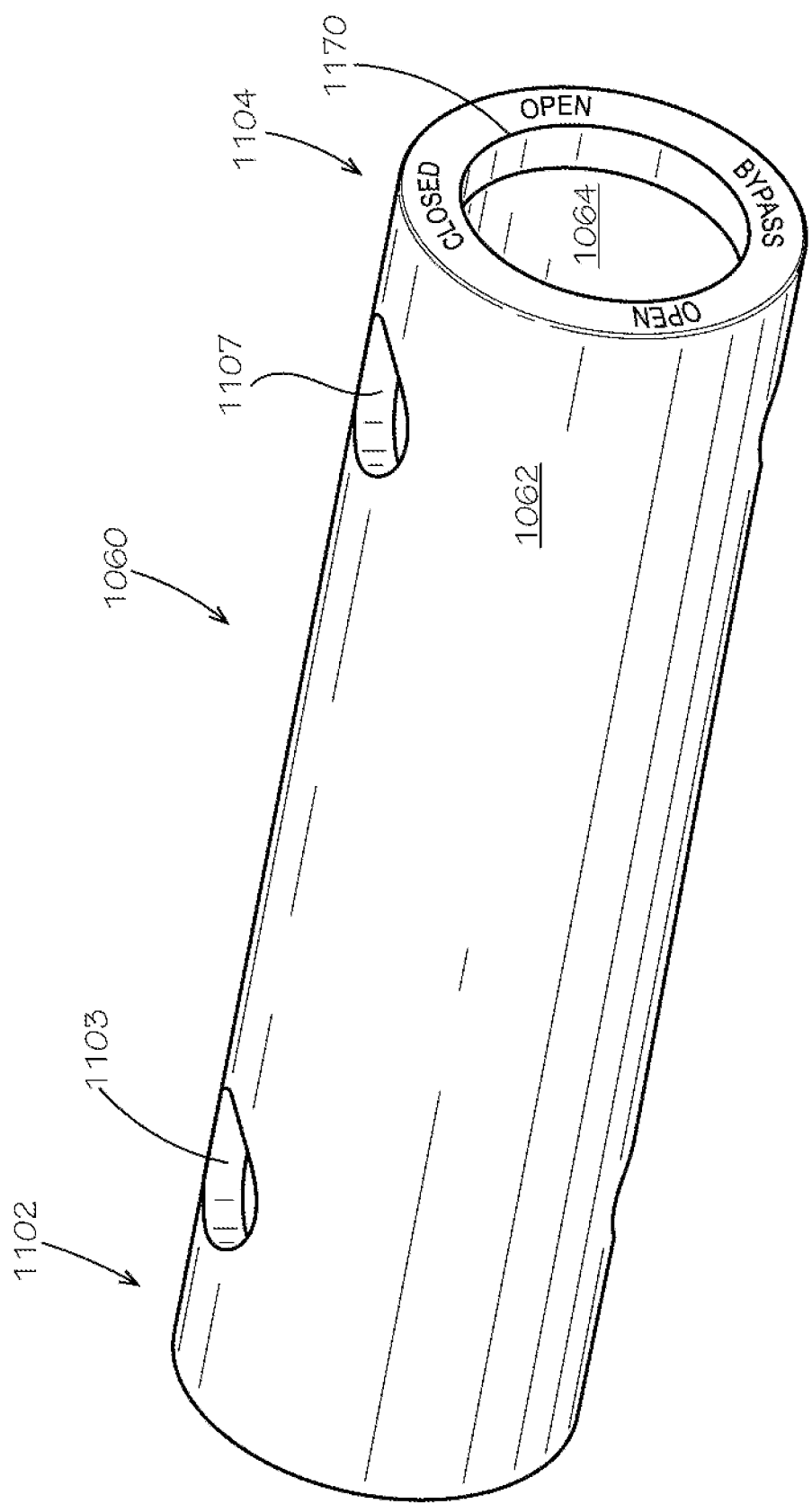
FIG. 2 is a perspective view of a housing of the meter bar of FIG. 1.
Figure 3:
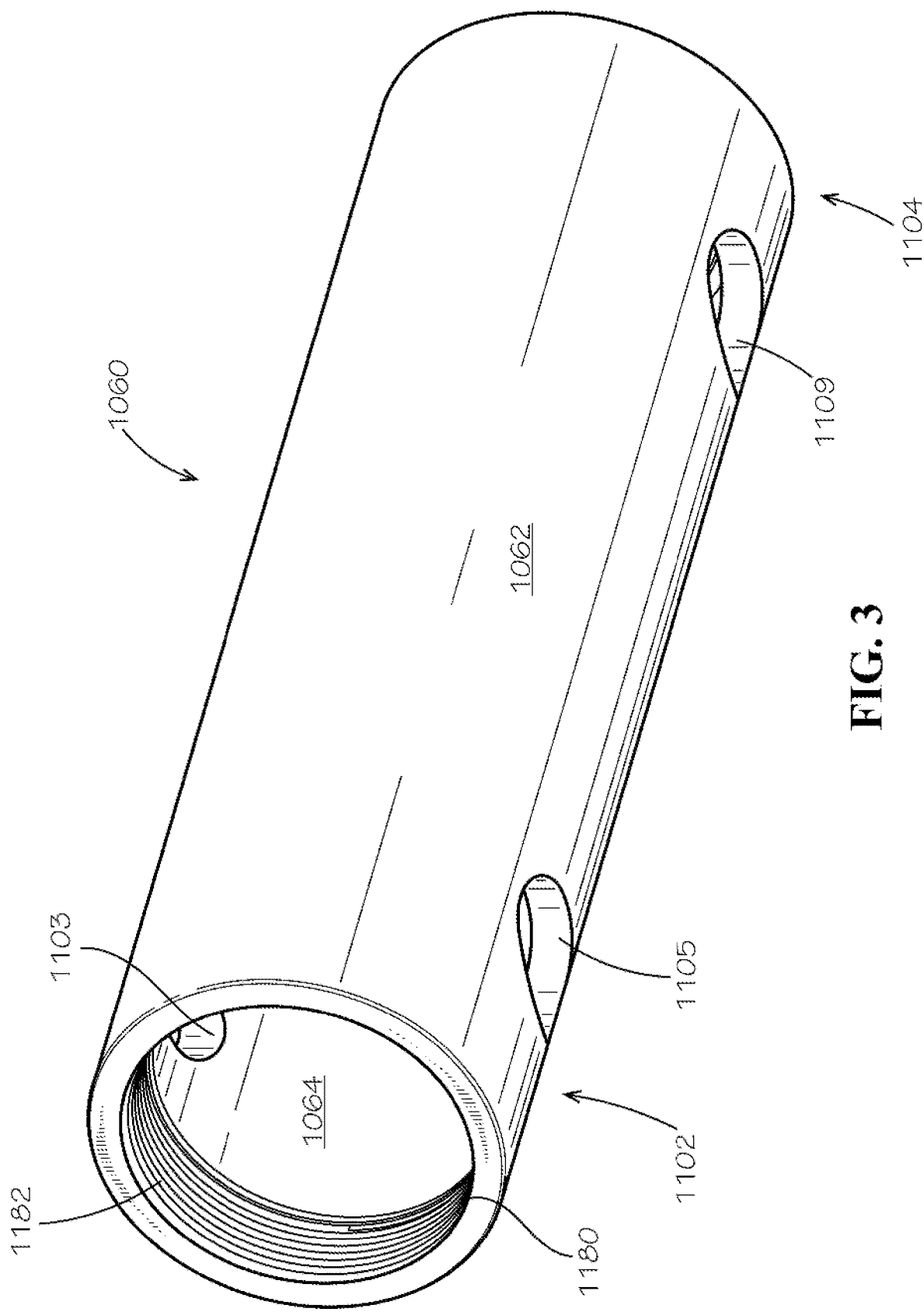
FIG. 3 is an alternative perspective view of the housing of FIG. 2.

As seen with reference to FIGS. 2 and 3, the housing 1060 can define a pair of upper portals 1103, 1107 and, similarly, a pair of lower portals 1105, 1109 as voids to provide access from an exterior of the housing 1060 to an interior of the housing 1060. The couplings 1003, 1007 can be attached to or connected to the housing 1060 around the portals 1103, 1107. In various aspects, the couplings 1003, 1007 can be integrally formed with the housing 1060 such that the portals 1103, 1107 are defined within the couplings 1003, 1007, respectively. The housing 1060 can define an outer surface 1062 and an inner surface 1064. The housing 1060 can be tubular as seen in the current aspect view. The housing 1060 can define a control portal 1170 along one end. In the current aspect, the control portal 1170 can be defined along an outflow end 1104 of the housing 1060. An inflow end 1102 can be defined along an end of the housing 1060 opposite the outflow end 1104. In the current aspect, the inflow end 1102 and outflow end 1104 of the housing 1060 can be defined coordinatingly with inflow end 1002 and outflow end 1004 of the meter bar 1000, such that the inflow ends 1002, 1102 and outflow ends 1004, 1104 are coincident. An access portal 1180 can be defined along the inflow end 1102 and opposite the control portal 1170. The access portal 1180 can define a threaded portion 1182 along the inner surface 1064 for inclusion of an end plug 1391 (seen with reference to FIG. 9).

Figure 4:
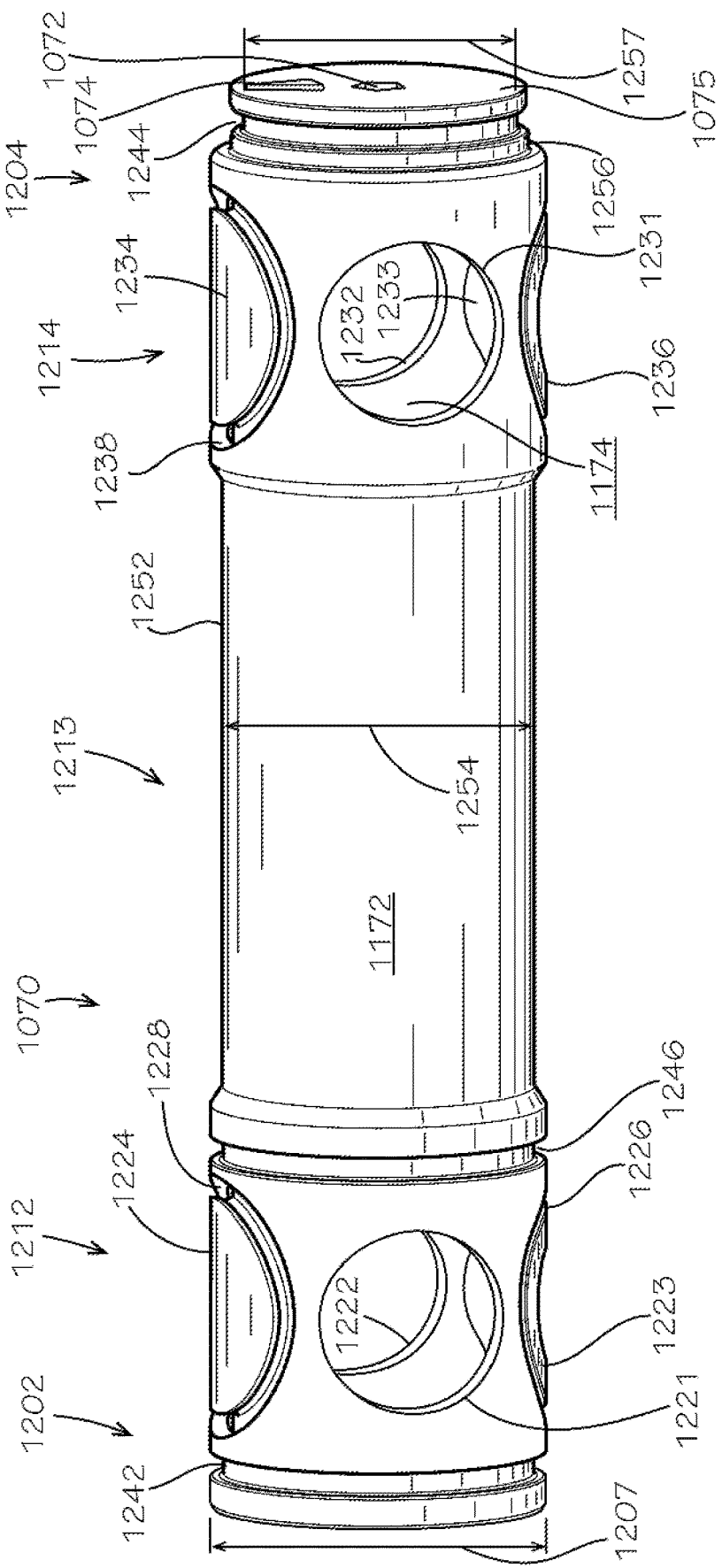
FIG. 4 is a perspective view of a key of the meter bar of FIG. 1.

The key 1070 can be seen with reference to FIG. 4. The key 1070 can be hollow and tubular similar to the housing 1070. The key can define an outer surface 1172 and an inner surface 1174.

The key 1070 of FIG. 4 is seen as can be formed initially. Additional parts can be connected to the key to form the key assembly, as discussed below. The key 1070 can define an inflow end 1202 and an outflow end 1204 with the indicia face 1075 located proximate the outflow end 1204 in the current aspect. The key 1070 can comprise an inflow portion 1212, a central portion 1213, and an outflow portion 1214. The inflow portion 1212 can define a first metering portal 1221, a second metering portal 1222, a bypass portal 1223, and a stop face 1224. Gasketing grooves 1226, 1228 can be defined around the bypass portal 1223 and the stop face 1224, respectively. The outflow portion 1214 can define a first metering portal 1231, a second metering portal 1232, a bypass portal 1233, and a stop face 1234. Gasketing grooves 1236, 1238 can be defined around the bypass portal 1233 and the stop face 1234, respectively. In various aspects, the gasketing grooves 1226, 1228, 1236, 1238 can be filled with an O-ring or various other gaskets known in the art. In various aspects, grease or other fluid seals can be utilized to prevent leakage.

The key 1070 can define a plurality of grooves and shapes to ease with assembly and sealing. An inflow end groove 1242 can be defined proximate the inflow end 1202. An outflow end groove 1244 can be defined proximate the outflow end 1204 and proximate the indicia face 1075. A central groove 1206 can be defined between the inflow end 1202 and the outflow end 1204. In various aspects, more or fewer grooves and shapes can be utilized for sealing or assembly. In various aspects, each of the inflow end groove 1242, outflow end groove 1244, and central groove 1206 can be fitted with an O-ring for sealing purposes. In various aspects, the various grooves 1242, 1244, 1206 can be selectively fitted with O-rings as needed. In various aspects, other sealing methods such as grease or fluid seals known in the art can be utilized to provide sufficient sealing. In various aspects, sealing means can be omitted if sufficiently tight machining of the key 1070 and the housing 1060 can be achieved. The central portion 1213 can define a recessed portion 1252. The recessed portion 1252 can be of a diameter 1254 that is smaller than a diameter 1207 of the key 1070. In various aspects, the inflow end groove 1242 and central groove 1206 be of a depth that is about the same as the diameter 1254. In varying aspects, the recessed portion 1252 can be of a diameter that is smaller than diameter 1254. The recessed portion 1252 can allow for ease of assembly when the key 1070 is integrated into the meter bar 1000 to reduce drag of the various parts. A shelf portion 1256 can be found proximate the outflow end 1204 that can be about the same diameter 1254. The outflow groove 1244 can be of a diameter 1257 that is smaller than the diameter 1254. The indicia face 1075 can be about the same diameter 1254. As such, the geometry of the key 1070 allows the indicia face 1075 to protrude through the control portal 1170 (see FIG. 2) while sealing with the outflow groove 1244.

Figure 5:
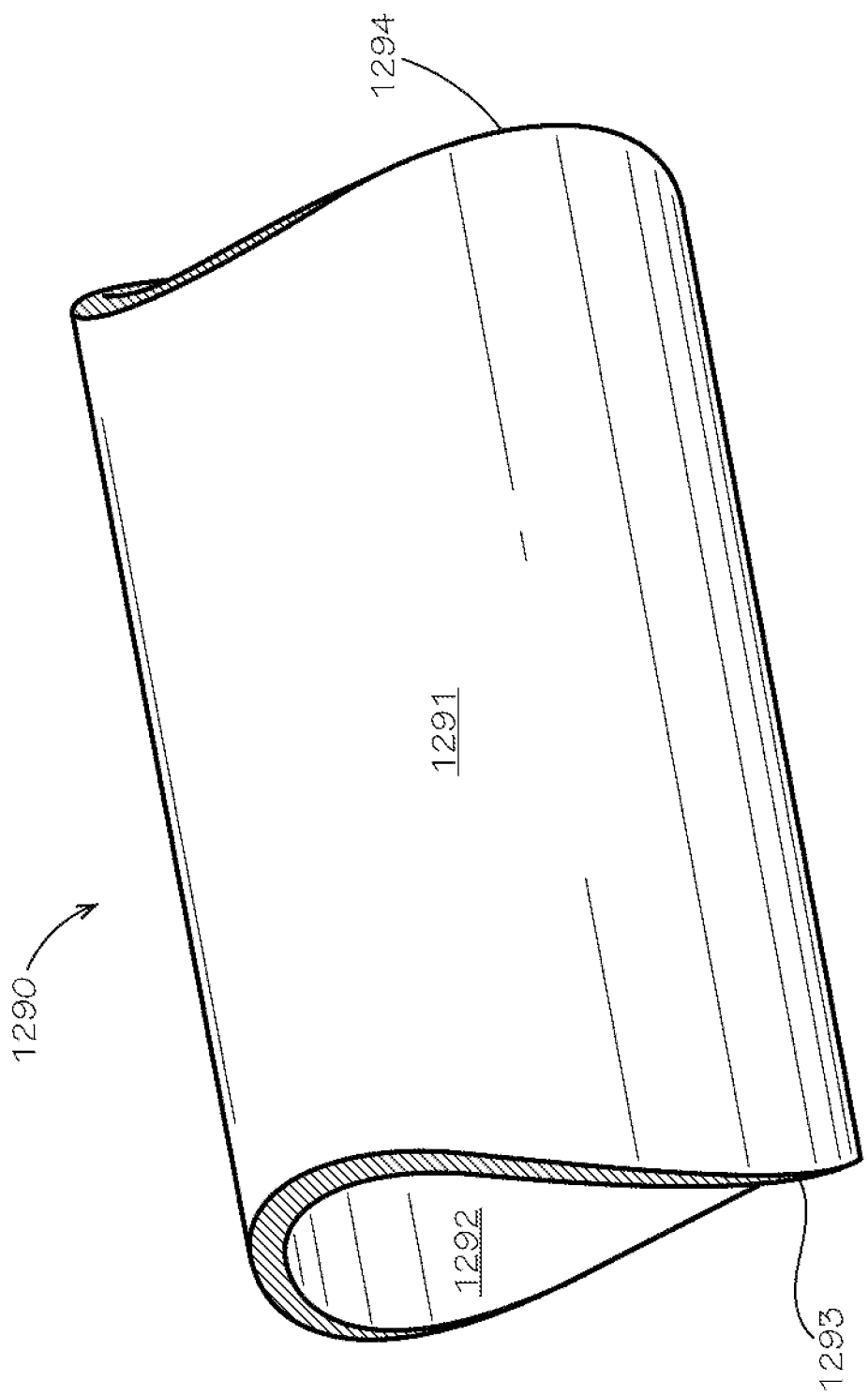
FIG. 5 is a perspective view of a junction tube of the meter bar of FIG. 1.

A junction tube 1290 can be seen with reference to FIG. 5. The junction tube 1290 can define an outer surface 1291 and an inner surface 1292 as well as a first end 1293 and a second end 1294. The junction tube 1290 can be generally cylindrical as shown in the current aspect. In various aspects, various shapes can be utilized without departing from the substance of the current disclosure. The first end 1293 and the second end 1294 can be formed or cut to interact with the cylindrical structure of the key 1070 as will be discussed below. The ends 1293, 1294 can be shaped to be joined to the key 1070 without substantial overlap. In various aspects, the junction tube 1290 can be various other shapes and can be connected to the key 1070 before being cut or formed to the shape of the key 1070.

Figure 6:
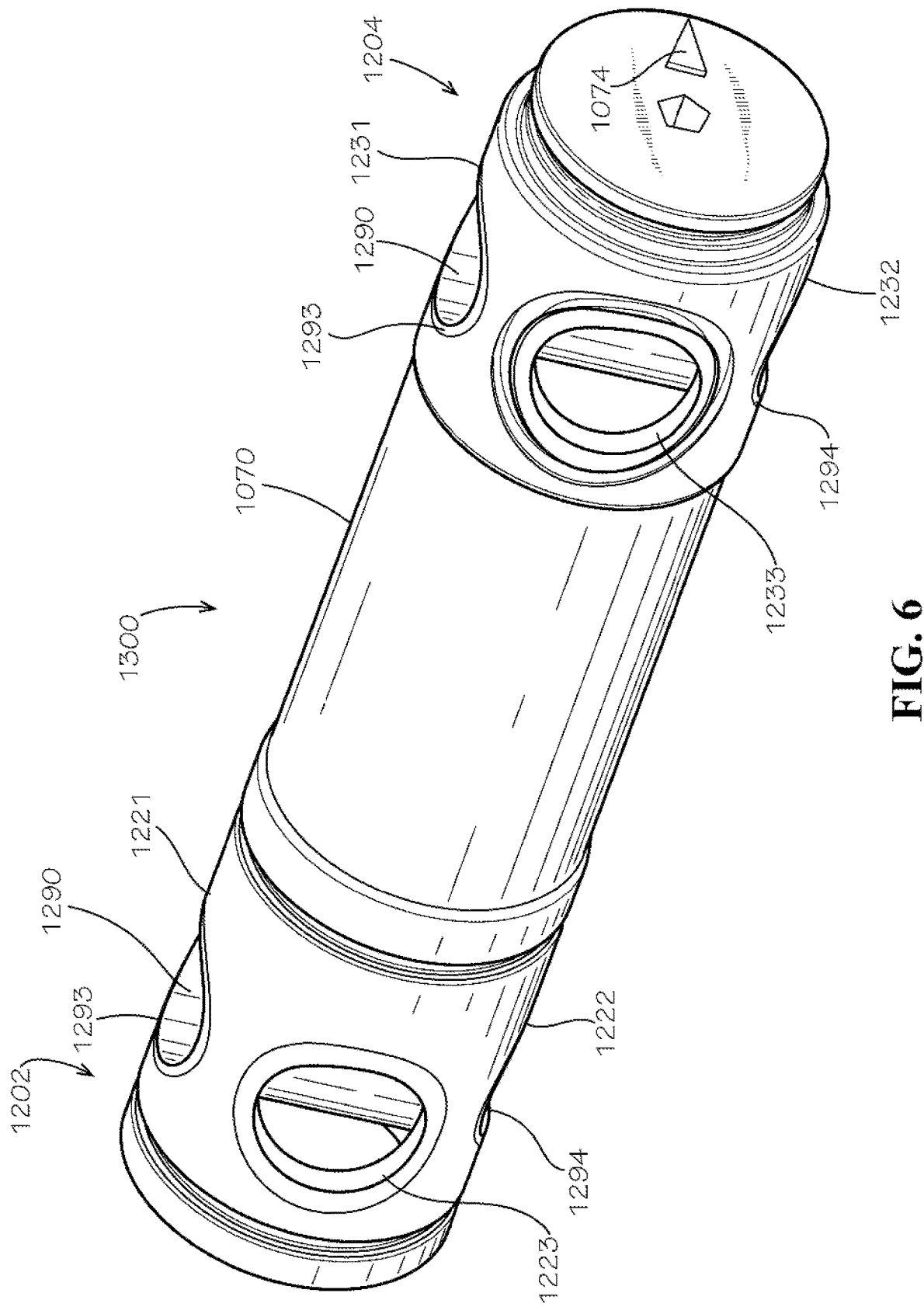
FIG. 6 is a perspective view of a key assembly of the meter bar of FIG. 1 including the key of FIG. 4.
Figure 7:
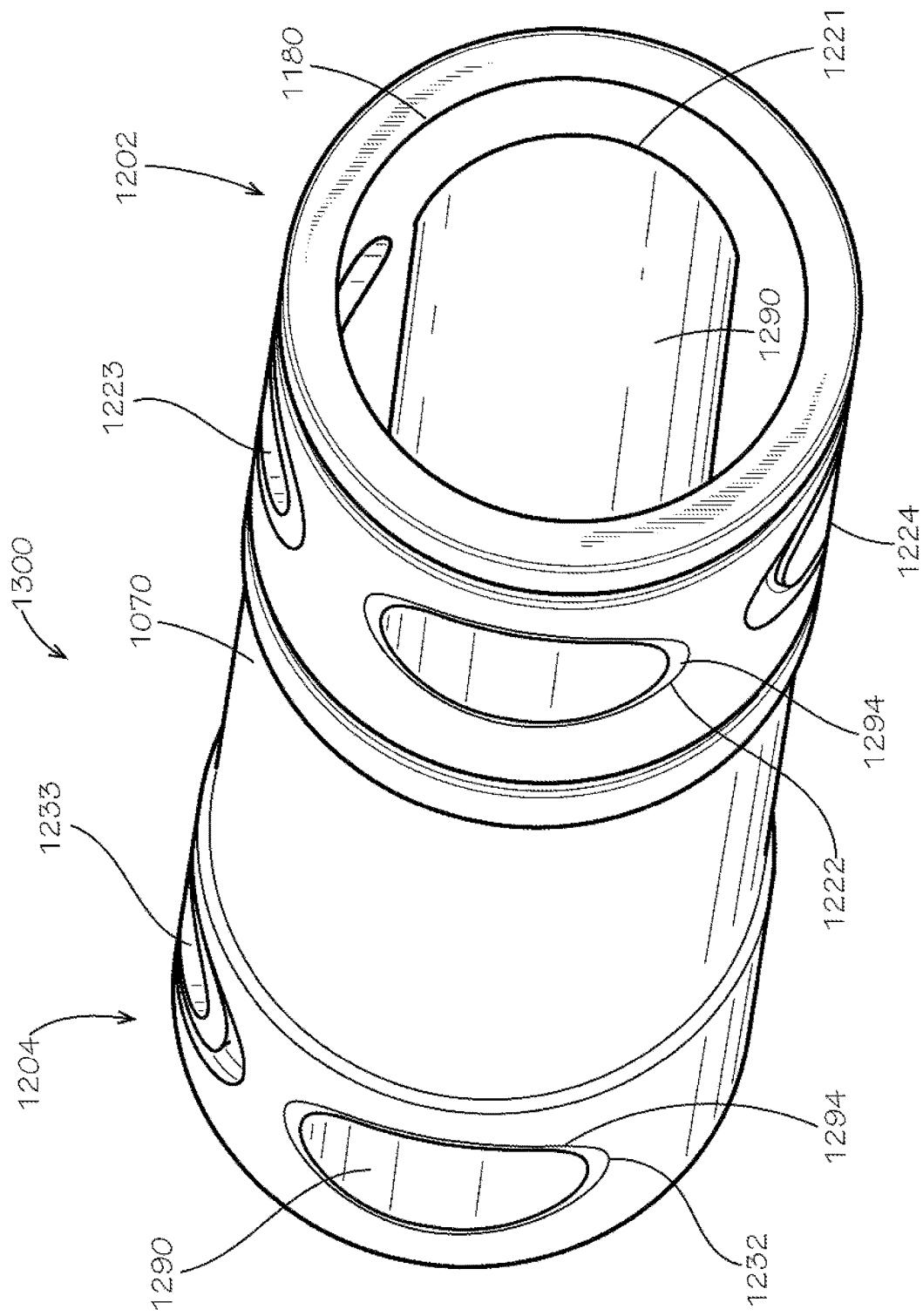
FIG. 7 is an alternative perspective view of the key assembly of FIG. 6.
Figure 8:
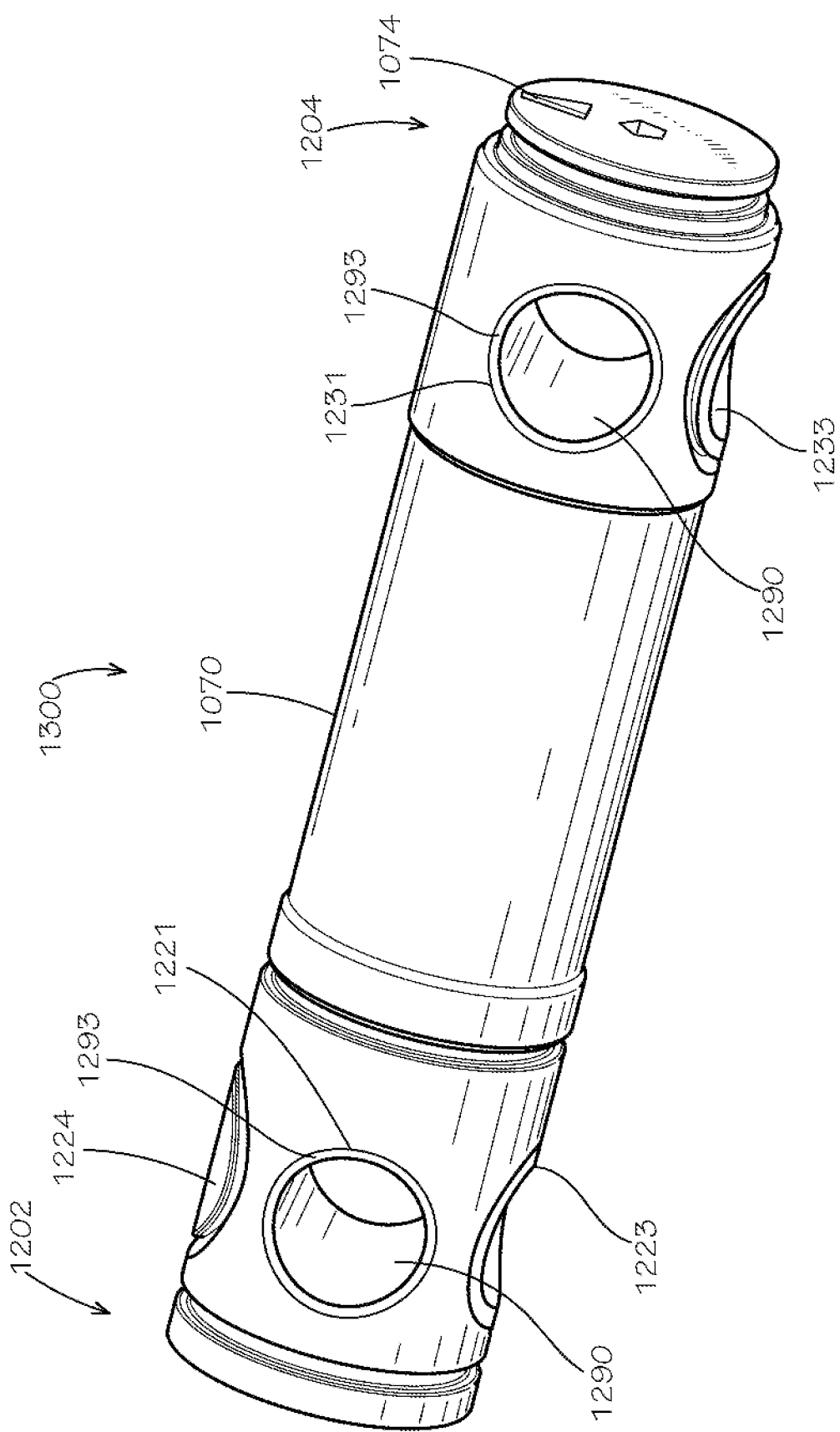
FIG. 8 is an alternative perspective view of the key assembly of FIG. 6.

A key assembly 1300 can be seen with reference to FIGS. 6, 7, and 8. As can be seen, the key assembly 1300 can comprise the key 1070 and a pair of junction tubes 1290 connected or joined to the key 1070. As can be seen, a junction tube 1290 can be connected to the key 1070 proximate the inflow end 1202 such that the first end 1293 can be connected to the key 1070 at the first metering portal 1221 and the second end 1294 can be connected to the key 1070 at the second metering portal 1222, thereby joining the first metering portal 1221 to the second metering portal 1222 in fluid communication. Similarly, a junction tube 1290 can be connected to the key 1070 proximate the outflow end 1204 such that the first end 1293 can be connected to the key 1070 at the first metering portal 1231 and the second end 1294 can be connected to the key 1070 at the second metering portal 1232, thereby joining the first metering portal 1221 to the second metering portal 1222 in fluid communication.

Figure 9:
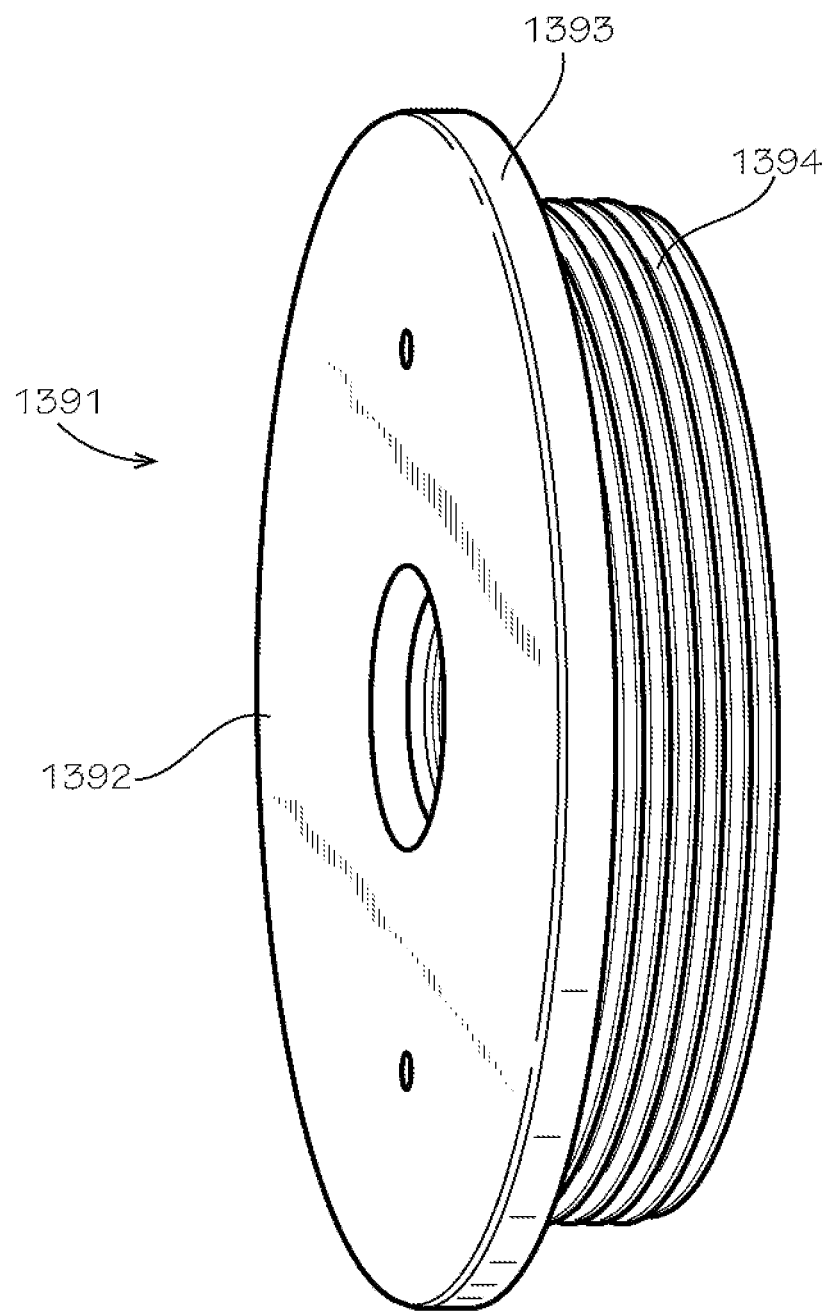
FIG. 9 is a perspective view of a plug of the meter bar of FIG. 1.

An end plug 1391 can be seen with reference to FIG. 9. The end plug 1391 can comprise an end face 1392, a sealing lip 1393 and a threaded portion 1394 for interaction with the threaded portion 1182. In various aspects, the end plug 1391 can be an NPT plug as understood by one of skill in the art. In various aspects, the plug 1391 can be operable by the same tool as the access element 1072. In various aspects, the plug 1391 can define its own access element similar to or coordinating with the access element 1072. Such unique tools can prevent tampering. In various aspects, the plug 1391 can provide access for testing of pressure and functioning of the gas system.

With reference to FIGS. 6-8 and FIGS. 1-2, the operation of the meter bar 1000 can be understood along with the explanation below. Along the inflow end 1002, upper coupling 1003 can be utilized in the current aspect as an inflow coupling to receive a fluid such as natural gas from a municipal utility supplier. In the current example—and for example purposes only—the upper coupling 1003 can be connected to the inflow fluid supply line. By way of example, fluid enters the meter bar 1000 through the upper coupling and can be directed in one of three ways based on the state of the meter bar 1000. When the meter bar 1000 is in the OPEN state as indicated by indicia arrow 1074 arranged to be pointed to one of the "OPEN" indicia of the markings 1061, the key assembly 1300 can be arranged so that the junction tube 1290 on the inflow end 1202 of the key assembly 1300 allows fluid to pass from the upper coupling 1003 to the lower coupling 1005. In the current aspect, the lower coupling 1005 can be connected to an inflow end of a fluid meter, such as a natural gas meter, connected to the gas supply line to provide municipalities with accurate measurement of a residence's or business's usage of fluid— by way of the current example, of natural gas. As natural gas flows through the meter, it is measured and then flows out of the meter. The lower coupling 1009 can be attached or connected to the outflow line from the meter, thereby allowing another point of entry of supplied fluid—in this case, natural gas—to enter the meter bar 1000. With the meter bar 1000 in the OPEN state, the fluid can be allowed to pass from the lower coupling 1009 through the junction tube 1290 to the upper coupling 1007. The upper coupling 1007 can be connected to a service line—leading to the end user, which can be a business or residence where the fluid is utilized. Systems such as these are in typical usage for supplying gas to businesses and residences—for example, for heating, cooking, or various industrial usage.

It can become necessary to service or to replace the meter. In such cases, the meter can be removed from the fluid supply line for service or replacement. However, if the meter is removed from the supply line without a bridge from the fluid, such removal can lead to problems further in the line. For example, in the cases of residential supply line of natural gas, pilot lights can be snuffed out for lack of fuel. Snuffing the pilot light can lead to discomfort for homeowners who have inconvenient pilot lighting arrangements; it can also lead to dangerous situations where the pilot is left unlit for sufficient time for gas to build up. Carbon monoxide poisoning or even explosions can occur. In the case of water metering, if the water supply is interrupted, fluid in the supply line can become contaminated.

To address this problem, the meter bar 1000 can be introduced. As indicated above, when the meter bar 1000 is in the OPEN state indicated by either of the "OPEN" indicia, the meter can function just as it does without the meter bar 1000. However, if service or replacement is required, the meter bar 1000 can be placed into the BYPASS state by utilizing a tool engaged into the access element 1072 to arrange the indicia arrow 1074 to the "BYPASS" marking of the markings 1061. When the meter bar 1000 is placed into the BYPASS state, the key 1070 can be arranged such that the bypass portal 1223 can be aligned with the fluid pathway of the upper coupling 1003 and the upper portal 1103. Similarly, the bypass portal 1233 can be aligned with the fluid pathway of the upper coupling 1007 through the upper portal 1107. However, when the meter bar 1000 is in the BYPASS state, fluid cannot pass into the lower couplings 1005, 1009 because fluid flowing into the key assembly 1300 can pass to an interior portion of the key 1070. The bypass portals 1223, 1233 can provide fluid communication along the inside of the key 1070. Fluid entering through the upper coupling 1003 can pass into the key 1070 through the bypass portal 1223, can travel through the central portion 1213 of the key 1070, and can then flow out of the bypass portal 1233 through the upper coupling 1007 to the service line. The meter bar 1000 in the BYPASS state can thereby bypass the meter entirely, and the meter can be safely removed or serviced without interrupting the service of the end user.

In certain situations, it may become desirable to close the service of fluid to an end user. Examples of such situations include cases an emergency (such as a fire, where natural gas should be disconnected) or cases of delinquency in payment of fees. In such cases, the meter bar 1000 can be arranged to the CLOSED state by arranging the key 1070 such that the indicia arrow 1074 points to the "CLOSED" marking of the markings 1061. In such arrangement, the stop face 1224 can be arranged in line with and/or covering the upper portal 1103 thereby preventing fluid communication through the meter bar 1000. While covering one upper portal 1103, 1107 can be sufficient to seal the fluid line and prevent fluid communication along the meter bar 1000 or through the fluid line, the CLOSED state can also include stop face 1234 arranged to cover the upper portal 1107.

In various aspects, the meter bar 1000 can be arranged to achieve the same objective through linear actuation rather than through rotation. Although not specifically disclosed and described here, the meter bar 1000 can be arranged to have a groove or arrangement of grooves that alters the flow path simply by sliding a key with a housing in linear fashion. Such an arrangement might prove advantageous in certain situations.

Figure 10:
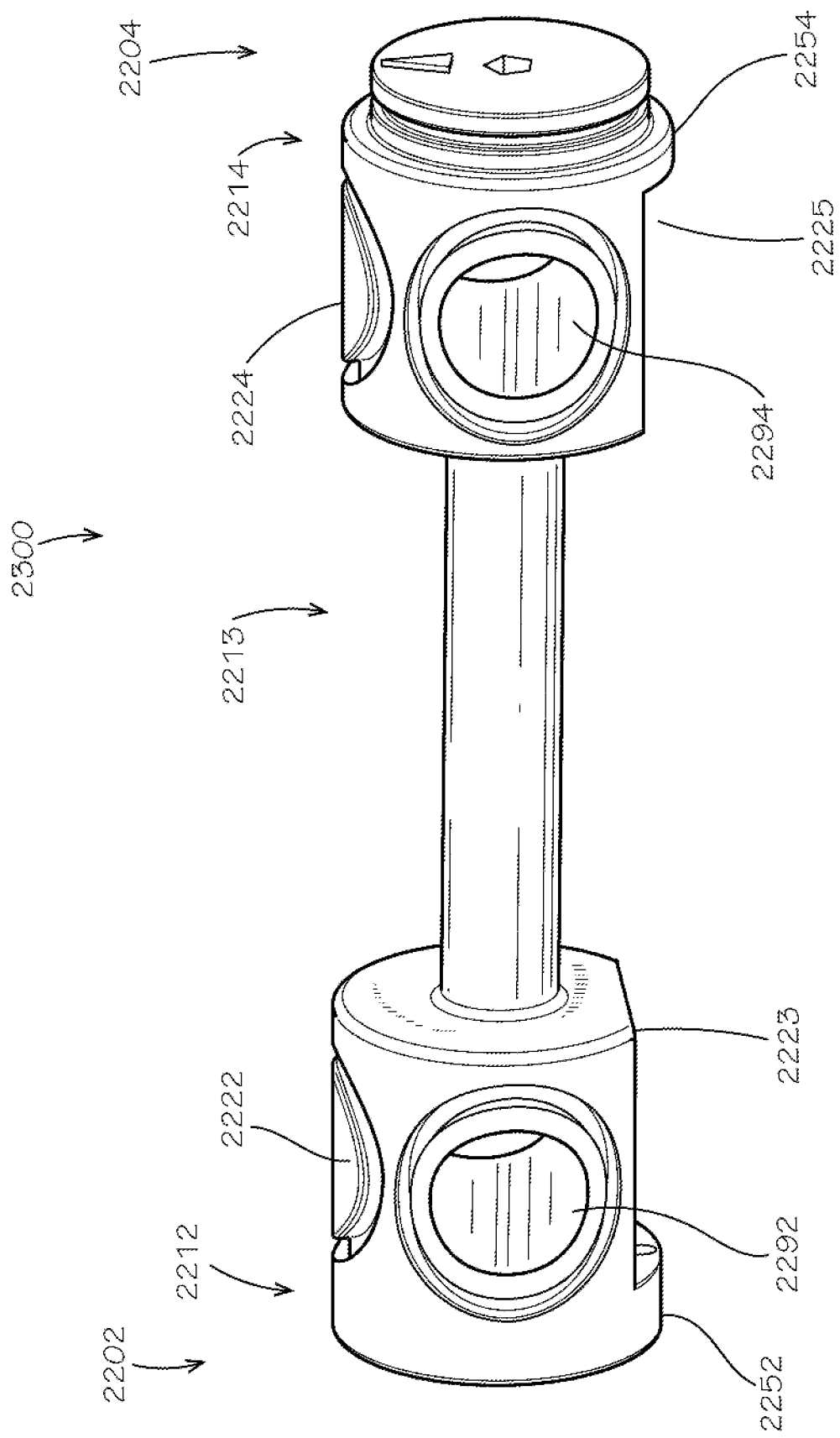
FIG. 10 is a perspective view of a key for use in a meter bar in accord with another aspect of the current disclosure.

Another aspect of the disclosure can be described with reference to FIG. 10. In one aspect, a key 2300 can be utilized with meter bar 1000. Various features of the various keys 1070, 2300 and key assembly 1300 can be interchangeable between the aspects. The key 2300 can be a replacement for key assembly 1300 in the meter bar 1000. The key 2300 can define an inflow end 2202 and an outflow end 2204. The key 2300 can comprise an inflow portion 2212, a central portion 2213, and an outflow portion 2214. In the current aspect, the key 2300 can be machined or formed from a single piece of cylinder. As such, portions of the key 2300 can be manufactured easily. The key 2300 can define an inflow passthrough 2292 and an outflow passthrough 2294. In the current aspect, the inflow passthrough 2292 and the outflow passthrough 2294 are cylindrical voids in the inflow portion 2212 and the outflow portion 2214, respectively. The passthroughs 2292, 2294 in the key 2300 can perform similar function to the junction tubes 1290 in key 1070. The inflow portion 2212 can define a stop face 2222 and the outflow portion 2214 can define a stop face 2224. The inflow portion 2212 and the outflow portion 2214 can be substantially cylindrical in shape. The inflow portion 2212 can define a bypass pathway 2223. The outflow portion 2214 can define a bypass pathway 2225. In the current aspect, both the bypass pathways 2223, 2225 can be flattened regions where material can be simply machined away. In various aspects, the bypass pathways 2223, 2225 can be of various shapes and arrangements to allow movement of fluid when integrated into the meter bar 1000. In the current aspect, the central portion 2213 can be of reduced volume both to ease with assembly and to reduce material. As such, the central portion 2213 can be provide a fluid pathway from bypass pathway 2223 to bypass pathway 2225.

As can be seen, each bypass pathway 2223, 2225 can be arranged so that it does not extend to the ends 2202, 2204, respectively. An edge portion 2252 can be arranged proximate the inflow end 2202 and an edge portion 2254 can be arranged proximate the outflow end 2204. When integrated into the meter bar 1000, the edge portions 2252, 2254 can provide a fluid seal with the housing 1060. Additional features of the key 2300 that are drawn similarly to features of the key 1070 can be understood by one of skill in the art as being coordinating or being included for the same purpose, although varying implementations are understood to be considered within the scope of the current disclosure as would be understood by one of skill in the art.

The meter bar 1000 can provide multiple advantages over other solutions that may attempt to address this problem. The meter bar 1000 has only a single moving part that is capable of altering the flow of fluid from the supply line to the service line through multiple portals. The meter bar 1000 is easily actuated and simple to use and to maintain, providing a single point solution to achieve redirection of fluid to/from a metering component as necessary to provide safety and easy of use for technicians without compromising a user's fluid service at the termination of the line.

One of skill in the art would understand that terms used for direction or reference such as "inflow" and "outflow" or "upper" and "lower" can be reversed or interchanged as the situation may present. These terms are not meant to be limiting on the scope of the disclosure, and the orientation or features of the meter bar 1000 can be reversed or reoriented without departing from the scope of the current disclosure.

Various parts of this disclosure can be made from varying materials. In one aspect, the key 1070 and the housing 1060 can be formed from ASTM A126 iron. In various aspects, various parts could be formed of stainless or carbon steel. In various aspects, various plastics could be utilized for various parts, including ABS plastics.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A meter bar comprising:
   a housing comprising an inflow end and an outflow end, the housing being hollow and defining an interior; and
   a key assembly arranged within the interior, the key assembly comprising an inflow end, an outflow end, and a recessed portion interposed between the inflow end and the outflow end, the key assembly comprising:
      a key being hollow and comprising an interior within the recessed portion providing a fluid pathway from the inflow end to the outflow end within the interior of the key, wherein a diameter of the recessed portion of the key is less than a diameter of the inflow end and the outflow end, the key comprising:
         a first metering portal proximate the inflow end;
         a first metering portal proximate the outflow end;
         a second metering portal proximate the inflow end and opposite the first metering portal proximate the inflow end;
         a second metering portal proximate the outflow end and opposite the first metering portal proximate the outflow end;
         a bypass portal proximate the inflow end; and
         a bypass portal proximate the outflow end;
      a junction tube connecting the first metering portal on the inflow end to the second metering portal on the inflow end; and
      a junction tube connecting the first metering portal on the outflow end to the second metering portal on the outflow end.

2. The meter bar of claim 1, wherein the key comprises an indicia face at one end of the key.

3. The meter bar of claim 2, wherein the housing comprises functional indicia indicating a rotation state of the meter bar.

4. The meter bar of claim 1, further comprising a pair of upper couplings and a pair of lower couplings, each upper coupling connected to the housing in fluid communication with one upper portal, each lower coupling connected to the housing in fluid communication with one lower portal.

5. The meter bar of claim 1, wherein each junction tube is sealed from fluid communication with a fluid bypass pathway defined from the bypass portal proximate the inflow end to the bypass portal proximate the outflow end.

6. The meter bar of claim 1, wherein the key assembly is selectably arranged within the housing in one of a variety of positions.

7. The meter bar of claim 1, wherein the key further comprises:
   a first stop face opposite the bypass portal proximate the inflow end; and
   a second stop face opposite the bypass portal proximate the outflow end.

\* \* \* \* \*